United States Patent Office 3,414,570
Patented Dec. 3, 1968

3,414,570
$N^2,N^4,N^6$-TRIPICRYLMELAMINE
Michael D. Coburn, White Rock, N. Mex., assignor to the United States of America as represented by the United States Atomic Energy Commission
No Drawing. Filed June 8, 1966, Ser. No. 556,822
1 Claim. (Cl. 260—249.6)

ABSTRACT OF THE DISCLOSURE

A heat-resistant explosive that is insensitive to impact and chemically described as $N^2,N^4,N^6$-tripicrylmelamine.

---

The invention described herein was made in the course of, or under, Contract W-7405-ENG-36 with the U.S. Atomic Energy Commission.

This invention relates to a method for preparing $N^2,N^4,N^6$-tripicrylmelamine.

The inventor has found that $N^2,N^4,N^6$-tripicrylmelamine is an inexpensive, heat resistant explosive that is insensitive to impact. Due to its physical properties and ease of preparation hereinafter described, $N^2,N^4,N^6$-tripicrylmelamine is competitive with many other heat resistant explosives presently being manufactured.

The $N^2,N^4,N^6$ - tripicrylmelamine is prepared from $N^2,N^4,N^6$-triphenylmelamine and a mixture of concentrated nitric and sulfuric acids, all of which are controlled under restrictive temperature range.

It is therefore an object of this invention to provide a process for the preparation of $N^2,N^4,N^6$-tripicrylmelamine. Other objects of this invention will become apparent from the following description of the preferred embodiment.

To a mixture of 15 milliliters of concentrated nitric acid (70% $HNO_3$) and 15 milliliters of concentrated sulfuric acid is added 2 grams of $N^2,N^4,N^6$-triphenylmelamine while maintaining a stirring rate such that the temperature of the entire solution does not exceed 70° C. After the completed addition of the $N^2,N^4,N^6$-triphenylmelamine, the mixture is stirred at 100° C. for 3 hours, cooled to 25° C., and poured into an ice water bath. The precipitated solid is collected by filtration and washed with water. The filtrate is then digested in boiling water for one hour and then dried in an oven to approximately 135° C. In addition, the amount of each acid in the said mixture may be varied from 5 to 15 milliliters per gram of the $N^2,N^4,N^6$-triphenylmelamine.

An analytically pure sample is obtained by dissolving the reaction mixture is acetone and passing the solution through a barium sulfate filter to remove any undissolved colloidal material. The compound is then precipitated from the solution by adding ethanol and collected using normal filtration procedures. Recrystallization from the acetonitrile-ethanol gives a product with the following analysis:

*Analysis.*—Calc. for $C_{21}H_9N_{15}O_{18}$: C, 33.21; H, 1.20; N, 27.67. Found: C, 33.27; H, 1.35; N, 27.73.

The structure of the $N^2,N^4,N^6$-tripicrylmelamine is as follows:

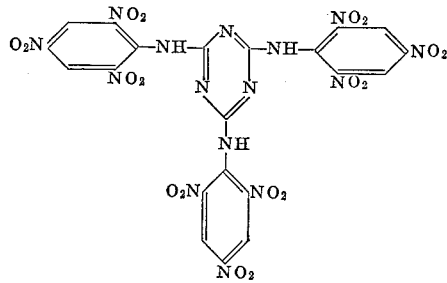

$N^2,N^4,N^6$-tripicrylmelamine is stable up to 300° C. and gives a DTA (differential thermal analysis) exotherm at 325° C. It has a drop-weight impact sensitivity of 320 cm. with a 2.5 kg. weight. The compound has a crystal density of 1.75 g./cc. and, at this density, it was calculated to have a detonation velocity of 7420 m./sec. and a C-J pressure of 240 kb.

In particular, although the foregoing specification only describes a method and product for preparing $N^2,N^4,N^6$-tripicrylmelamine, the foregoing illustrations of the present invention are not intended to limit its scope which is to be limited entirely by the appended claims.

What is claimed is:
1. The composition of matter $N^2,N^4,N^6$-tripicrylmelamine having the structure formula

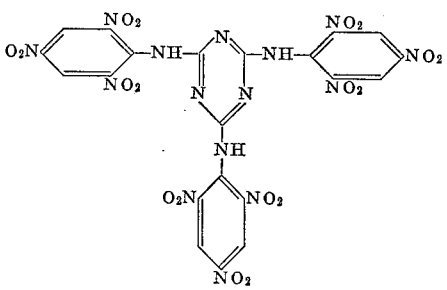

References Cited

Fuson, "Reactions of Organic Compounds," John Wiley & Sons, Inc., New York, pp. 20-1 (1962).

HENRY R. JILES, *Primary Examiner.*

JOHN M. FORD, *Assistant Examiner.*